United States Patent [19]

Gnanamuthu

[11] E Re. 29,815

[45] Reissued Oct. 24, 1978

[54] CLADDING

[75] Inventor: Daniel S. Gnanamuthu, Weymouth, Mass.

[73] Assignee: Avco Everett Research Laboratory, Inc., Everett, Mass.

[21] Appl. No.: 806,924

[22] Filed: Jun. 15, 1977

Related U.S. Patent Documents

Reissue of:

[64] Patent No.: 3,952,180
Issued: Apr. 20, 1976
Appl. No.: 529,379
Filed: Dec. 4, 1974

[51] Int. Cl.[2] ..... B23K 27/00

[52] U.S. Cl. ..... 219/121 LM; 219/76.1

[58] Field of Search ..... 219/76, 121 L, 121 LM, 219/121 BM, 121 EB, 137

[56] References Cited

U.S. PATENT DOCUMENTS

| | | | |
|---|---|---|---|
| 1,986,704 | 1/1935 | Bannister | 427/360 |
| 3,139,511 | 6/1964 | Kudelko | 219/76 |
| 3,185,814 | 5/1965 | Rössner et al. | 219/76 |
| 3,296,408 | 1/1967 | Arnoldy | 219/76 |
| 3,310,423 | 3/1967 | Ingham | 427/53 |
| 3,428,774 | 2/1969 | Faust et al. | 219/76 |
| 3,493,713 | 2/1970 | Johnson | 219/76 |
| 3,573,420 | 4/1971 | Johnson | 219/76 |
| 3,673,374 | 6/1972 | Hauck | 219/73.11 |

FOREIGN PATENT DOCUMENTS

| | | |
|---|---|---|
| 1,295,960 | 3/1969 | Fed. Rep. of Germany. |
| 2,059,732 | 1/1971 | France. |

*Primary Examiner*—J. V. Truhe
*Assistant Examiner*—Fred E. Bell
*Attorney, Agent, or Firm*—M. E. Frederick; Jerry Cohen; Charles Hieken

[57] ABSTRACT

A metal layer is clad to a metal substrate by laying spaced rods or wires of a cladding metal on the substrate surface and scanning the cladding metal with a continuously operating laser beam, part of which impinges directly on the cladding metal to melt it and part of which impinges on the adjacent surface area of the substrate to improve flow of molten metal thereon. The cladding metal may be fed to the substrate surface in synchronism with laser beam scanning. The process produces a clad layer of the cladding metal on the substrate characterized by a fine and homogeneous structure within the clad on layer and further characterized by uniform and high hardness compared to prior art cladding methods. The surface of the clad may be smoothed by locally oscillating the laser beam during the course of cladding and/or by multiple passes.

17 Claims, 13 Drawing Figures

MAGNIFICATION 500X

MAGNIFICATION 500X

MAGNIFICATION 100X

MAGNIFICATION 100X

CLADDING

Matter enclosed in heavy brackets [ ] appears in the original patent but forms no part of this reissue specification; matter printed in italics indicates the additions made by reissue.

BACKGROUND OF THE INVENTION

The present invention relates to cladding metals upon metallic substrates.

There are many known and long practiced methods for improving the resistance of fabricated or semifabricated metal (including elements, alloys and compounds) to wear, galling, spalling, deformation, corrosion, heating and/or erosion. These include overcoating the surface of the metal and modification of the composition and/or microstructure of the surface through such techniques as carburizing, nitriding, siliconizing, diffusion hardening, hard surfacing (welding a high-alloy layer to the surface), flame hardening, induction hardening and physical modification (e.g. peening). The overcoating methods include electroplating chromium or nickel onto the surface and roll cladding (for sheet form or wire form mill products). Surfaces may also be enhanced by cladding on materials through melting at the substrate surfaces, such as by laying rods of hard material on the metallic surface and melting by passing the flame of an oxy-acetylene torch thereover. Surfaces may also be enhanced by forming alloys in situ through deposition of minor alloy components and heating with a laser to produce melting and diffusion as taught in the co-pending application of Gnanamuthu, et al., Ser. No. 431,240, filed Jan. 7, 1974.

It is an important object of the present invention to provide a cladding method effective to produce high adherence of a thick layer of metal to the surface of a substrate.

It is a further object of the invention to provide fine and homogeneous microstructure within the clad-on layer consistent with the preceding object.

It is a further object of the invention to provide high and uniform hardness within the clad-on layer consistent with one or more of the proceeding objects.

It is a further object of the invention to minimize interdiffusion between cladding and substrate materials consistent with one or more of the preceding objects.

It is a further object of the invention to provide a smooth clad surface consistent with one or more of the preceding objects.

It is a further object of the invention to provide high density - low porosity surface layers of materials consistent with one or more of the preceding objects.

It is a further object of the invention to utilize standard equipments borrowed from other major purposes and not necessarily dedicated to surface modification consistent with one or more of the preceding objects.

It is a further object of the invention to provide flexibility of process control consistent with one or more of the preceding objects.

It is a further object of the invention to minimize incidental effects on the substrate below the surface layer consistent with one or more of the preceding objects.

It is a further object of the invention to provide minimal working time and related substrate preparation and posttreatment times consistent with one or more of the preceding objects.

SUMMARY OF THE INVENTION

In accordance with the invention, one or more units of cladding material are placed face to face with a substrate surface to be clad and a continuous wave output (cw) laser beam, is scanned along the cladding material to melt it. The units are of elongated form, i.e., rod, wire or ribbon and the scanning is carried out longitudinally, i.e., parallel to the direction of elongation. The rate of scanning is such that the melted material resolidifies very quickly as a bonded on clad at the substrate surface. During the brief time of residence in the molten state, the molten material flows laterally along the substrate surface.

A laser beam core portion containing a majority of the radiant energy of the beam impacts the cladding material for melting and a fringe portion of the beam impacts the adjacent substrate surface area to make it more readily wettable by the molten cladding material and allow more uniform flow. The relative motion between the substrate and laser beam for scanning may be effected by beam deflection, substrate movement or a combination of the two.

Multiple spaced units of cladding material may be placed on the substrate surface at the same time or in a sequence, synchronized with a scanning rate. The resultant clad on layer often has a wavy form with peaks at the sites of cladding material placement. If it is desired to avoid the wavy surface of resultant clad material, then the clad on layer can be smoothed by locally oscillating the radiant energy beam during cladding and/or through multiple heating passes. The spacing between units of cladding material is preferably at least one-half of unit width.

It has been found in the practice of the invention that massive reinforcing particles of high hardness in the cladding material such as carbide particles in stellite alloy rods are dissolved in the melting cladding material and upon resolidification are reproduced in the matrix at a much finer scale than they originally appeared in the rods, thereby giving the clad on layer in a high uniform hardness. This is in contrast to microstructures observed in such conventional processes as oxy-acetylene cladding wherein large inclusions of carbide particles may be observed in the finished clad. Starting composition of the cladding material is preserved in the final product of the present invention; there is very low interdiffusion with or dilution by substrate material.

The radiant energy beam size for purposes of the present invention is from 0.025 inch to 1.0 inch diameter circle, or non-circular forms of the equivalent area, applied with a power of 1 to 20 kilowatts at a scanning rate of 5 to 50 inches per minute. Among the cladding materials which may be advantageously applied through use of the present invention are cobalt, iron and/or nickel base alloys and other alloys or pure metals or intermatallic compounds. The suitable substrates include essentially all metallic elements, compounds and alloys. However, the substrate material must not melt (excepting optionally, for a thin surface layer thereof as described below) under conditions of melting and superheating the cladding material.

These and other objects, features and advantages of the invention will be apparent from the following detailed description of preferred embodiments of the invention taken in conjunction with the accompanying drawing in which:

DETAILED DESCRIPTION OF PREFERRED EMBODIMENTS

Figure 1:
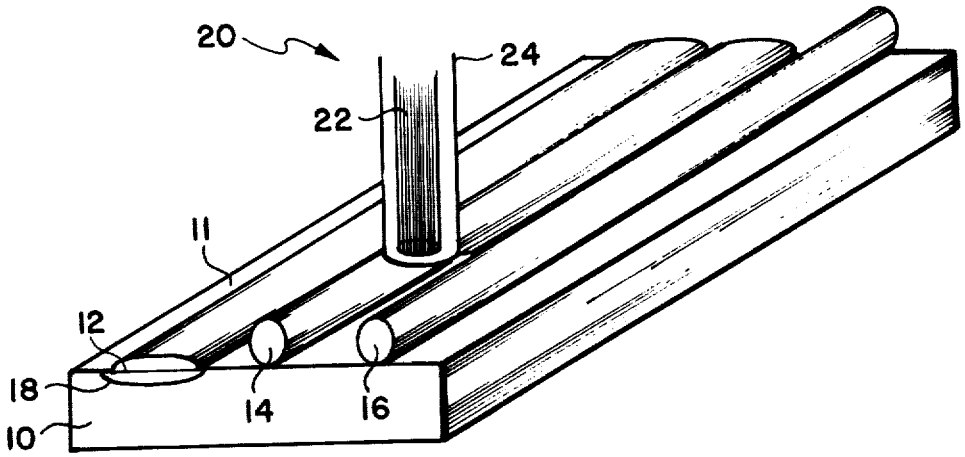
FIG. 1 is an isometric, partly sectioned sketch of a substrate metallic plate being clad in accordance with a preferred embodiment of the process of the invention and indicating the scanning radiant energy beam which does the cladding.

Referring now to FIG. 1, there is shown a substrate plate 10 in the course of cladding in accordance with a preferred embodiment of the present invention. For purposes of this illustration, it is indicated that three rods of cladding material have been applied and one of them, 12, has already been method, another, 14, is in the course of melting and a third, 16, has not yet been melted. The heat affected zone of the substrate underlying the first melted rod 12 is indicated at 18. The melting is carried out by laser beam 20 having a core portion 22 and a fringe portion 24 of the beam. The scanning is carried back and forth lengthwise along the rods with the loci of beam impact in successive scanning passes overlapping so that there will be a continuous heat affected zone running along the surface 11 of the substrate.

Before cladding, surface 11 may be coated with a ¼–½ mil thick layer of manganese phosphate using any of several known commercial phosphating processes or coating by application of a slurry of graphite in isopropyl alcohol and heating to drive off the alcohol to improve the radiant energy absorbtivity of the surface. Carbon black may also be applied as the absorbing coating. The rods are not coated. Also, before cladding, it is preferable to preheat the substrate 10, typically to about 400°–700° C, and then apply the cladding material. The cladding material may be in forms other than rod forms as indicated in the drawings, such as strips or spheres for instance. However, there should be spaces of exposed substrate surface between units of cladding material to allow the flow of molten cladding material.

Figure 1A:
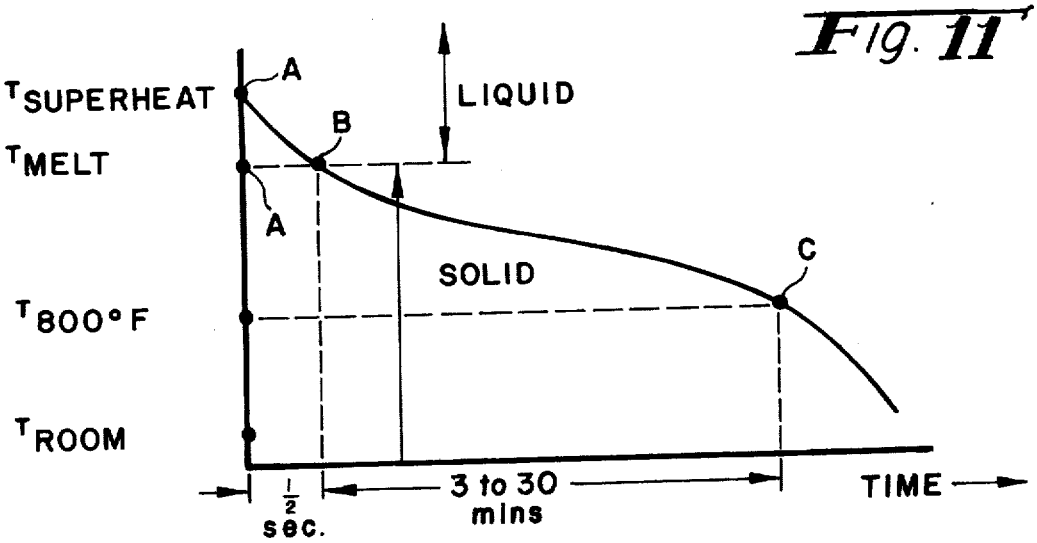
FIG. 1A is a temperature-time profile for cooling the plate in the above process.

The clad parts are preferably post heated to avoid formation of cracks caused by rapid cooling. FIG. 1A shows a typical profile for temperature vs. time in cooling, indicating a very rapid cooling from superheat temperature to melting point [A to B] to produce fine grain structure in the clad on part. Slow cooling down to C (about 800° F) prevents cracking and rapid cooling may be thereafter maintained down to room temperature.

During laser scanning, an inert, reducing or carburizing atmosphere may be employed. Use of a carburizing atmosphere is preferred on iron or steel parts to lower the melting point of a limited surface portion of the substrate to enhance flow of the molten cladding material thereon.

For a typical case, stellite rods are melted at approximately 2400° F and superheated to approximately 3000° F, cooled in half a second back to 2400° at 1200° F/sec. (A to B), then cooled for 15 minutes at 107° F/min. The substrate (e.g., steel) stays below its melting point at 2700°–2800° F. But a surface layer thereof may be carburized in a suitable carburizing atmosphere, e.g., using an oxy-acetylene torch so that its melting point will be about 2600° F and this temperature is reached during cladding.

The core of the beam is preferably limited to a size smaller than the diameter of width of the cladding rod to avoid direct impingement on the substrate space between rods. The rods absorb sufficient laser power that melting heat input to the substrate is avoided excepting in said limited surface portion thereof. To this end thick units of cladding material of at least 10 mils and preferably on the order of 50–200 mils are continuously arrayed in the path of the high power density beam.

Figure 2:
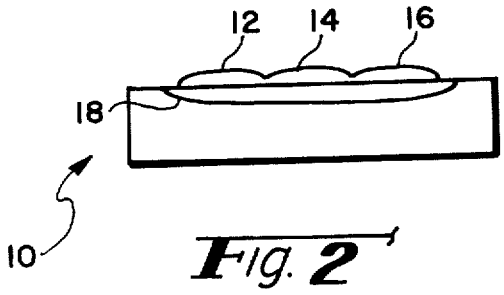
FIGS. 2 and 2A are cross-sectional views of FIG. 1 materials after single and multiple cladding passes.
Figure 2A:
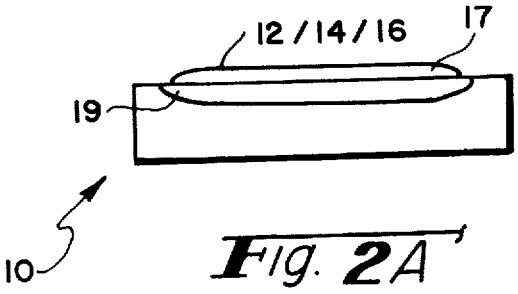

FIG. 2 shows the resultant clad product produced in accordance with processing of FIG. 1 wherein the three melted rods 12, 14, and 16 are resolidified as a continuous clad of wavy profile. This waviness may be avoided by locally oscillating the laser beam in the course of melting; that is, by laterally or longitudinally oscillating the beam at a rate much higher than its scanning rate. Multiple passes, preferably with local oscillation, also tend to produce the greatest smoothness of the clad. Such smoothing techniques may be utilized to avoid the need for expensive surface grinding of the clad after completion of the process. The resultant smoothed clad product is indicated in FIG. 2A wherein the clad-on-layer is indicated at 17.

Preferably, a 1–20 kilowatt laser beam focused to a 0.025 to 0.7 inches diameter circle or area equivalent of other form with a core diameter of ⅛–½ total beam diameter, is scanned across the surface to be clad at a rate of 5 to 25 inches per minute. Power density of the core of the beam for cladding [at the focal point can be considered to possess a] *is* 20 to 500 kw/in$^2$. The beam energy distribution *at the focal point can be considered to possess a* [is] Gaussian *distribution* and defines concentric Airy discs with the core disc being typically ⅛(0.025) inches and having a power density of 34.2 kw/cm$^2$, the density averaged over the second Airy disc (¼ inch diameter) being 13.4 kw/cm$^2$ for 10 kw of total laser power.

In local oscillation, the rate of oscillating is such, in relation to scan rate, that the beam core impinges the same point at least 500, preferably at least 1000, times during the said period of molten state residence. For instance, during a 9 inch per minute scan by a ¼ inch beam (calculated on second Airy disc) locally oscillated at 690 Hertz, over half an inch of lateral travel, the beam will impinge the same point 1150 times. The total energy applied is typically 1000–5000 Joules over a period of 100 or more milliseconds thereby allowing time for melting, superheating and smoothening flow of the cladding material.

The scan pattern is in linear traces of adjacent closely spaced parallel lines which work incrementally across an area to be clad Local oscillation, it used, may be longitudinal (i.e., parallel to scan line direction). Lateral (orthogonal to scan) or a combination of the two and/or may comprise beam cross-section-form changing such as a change from circular to cruciform or stellate.

The power density used for smoothening the successive clad zones is 20 to 50 percent of that for cladding. Typical times of residence in the molten state for any given portion of cladding material are 0.1 to 2.0 seconds. It is also possible to produce a laser beam without a high power density core relative to a low power density fringe, i.e., having substantially uniform power density, and such a beam may be essentially as wide as the diameter of the rods to be melted thereby. Heat transfer to the substrate via the cladding material provides the necessary substrate surface conditioning improving its wettability but limiting substrate melting to a superficial surface layer thereof, i.e., less than 1/5 of clad thickness.

It is important to control heating conditions so that the cladding material not only melts, but is superheated so that the lowest melting phase dissolves other phases thereof. In the case of stellite rods, this superheating allows massive carbide particle inclusions to be dissolved. The rapid rate of scanning allows quick cooling and prevents the regrowth of precipitates.

High power lasers suitable for use in connection with the present invention may be the type shown in the copending application of Edward V. Locke and Richard A. Hella, Ser. No. 322,783, filed Jan. 11, 1973, now U.S. Pat. No. 3,817,606 of common assignment with the present application and in U.S. Pat. No. 3,702,973 granted Nov. 14, 1972, the disclosures of which are incorporated herein by reference as though set out at length herein. Such lasers comprise an exciting electron beam source chamber and a gas lasing chamber with a lasing gas (e.g., a mixture of helium, nitrogen and carbon dioxide) and an optical cavity. The electron beam initiates and sustains lasing activity within the optical cavity and an output light beam is controlled by deflection optics and beam tunnels to scan, and cut off (if necessary) the light beam.

Figure 3:
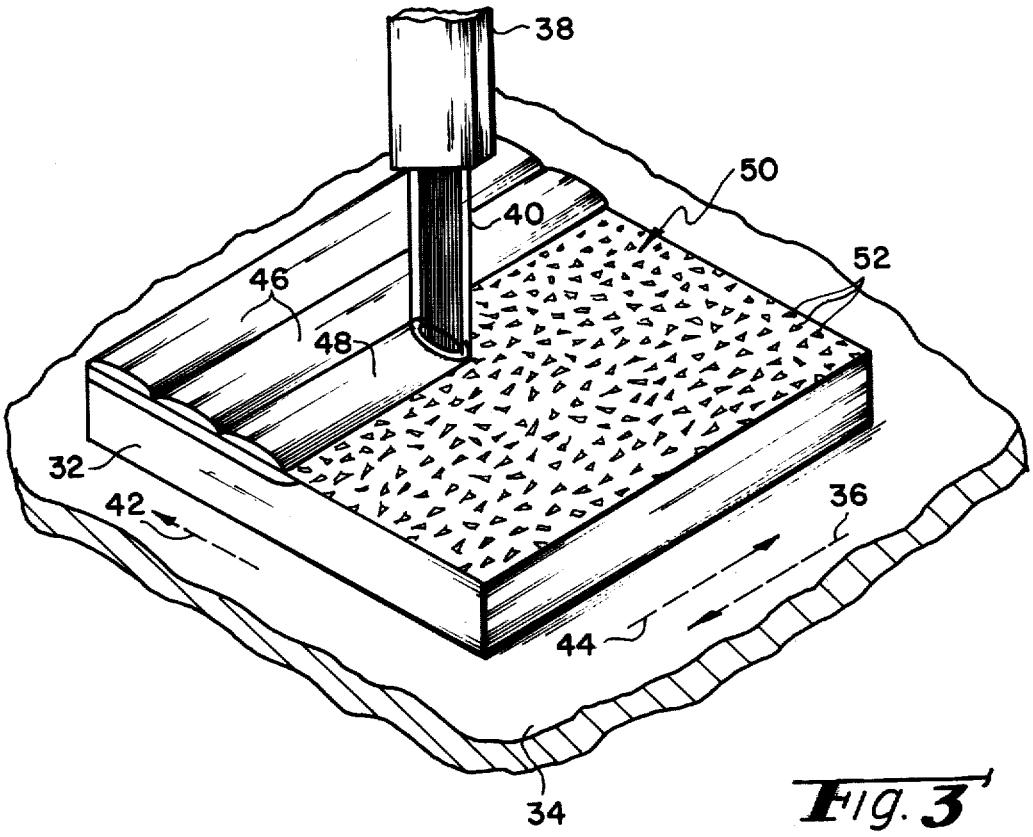
FIGS. 3 and 4 are isometric partly sectioned sketches of substrates being clad in accordance with further preferred embodiments of the invention.
Figure 4:
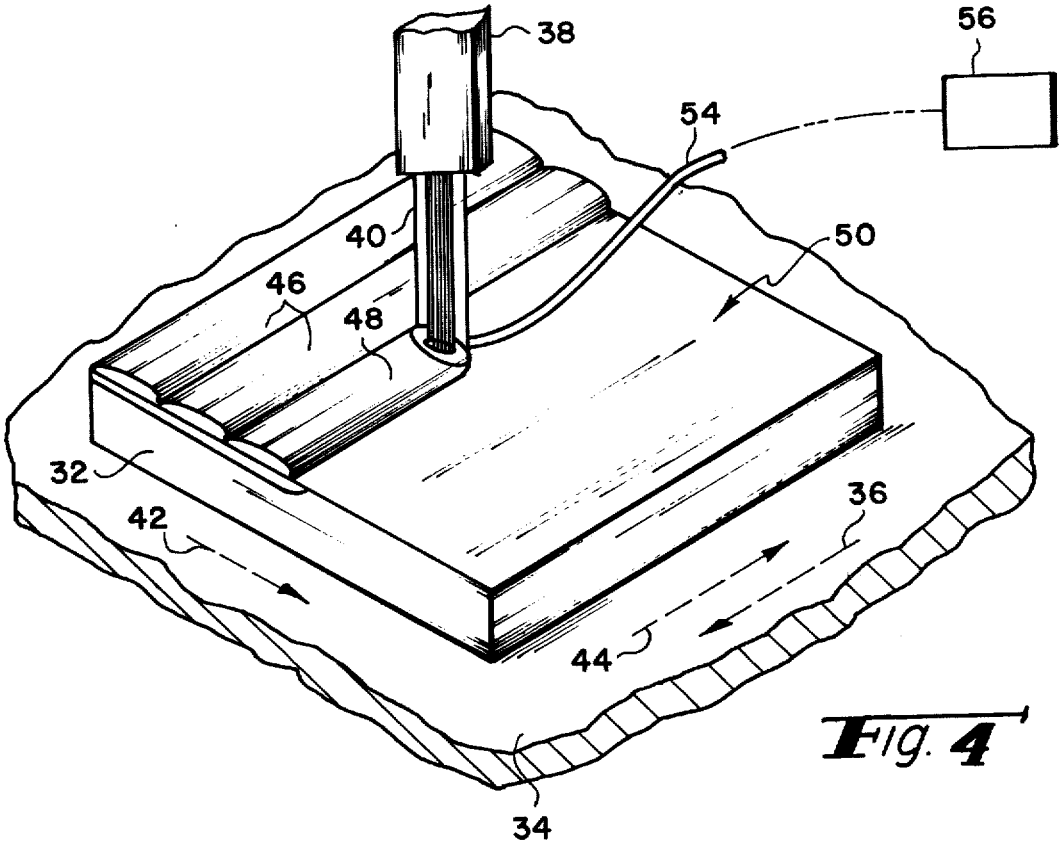

FIG. 3 and 4 show further preferred embodiments of the invention in which spaced units of cladding material are melted and resolidified to form a continuous clad-on layer on the surface of a substrate. Both embodiments are illustrated with respect to a substrate plate 32 mounted on a work table 34 which traverses in working passes, in a direction indicated by arrow 36, under a laser 38 which emits a beam 40. The table makes incremental lateral steps by movement in the direction indicated by arrow 42 at the end of each working pass and retraces by movement in the direction indicated by arrow 44. The laser beam may be shut off (deflected) during retrace or applied during retrace as desired.

In both FIGS. 3 and 4, two rows 46 of clad have been formed and a third row 48 is partially completed. In the remaining unworked area 50 of the substrate surface the spaced units of cladding material comprise a layer of spaced powder particles 52 in FIG. 3 and, in FIG. 4, a wire 54 fed continuously by a feeder 56 to a point under the beam 40 in contact with the substrate surface. The wire is fed in sequence along adjacent parallel paths, spaced from each other by a distance of one-half to one wire diameter.

In the FIG. 3 embodiment, the porosity of the loose powder provides the necessary spacing between units for flow of molten material and to limit the molten zone to a predetermined strip region related to laser beam width.

In the FIG. 4 embodiment, the wire feeding, together with the described workpiece displacement provides temporal as well as physical spacing between units of cladding material.

In all the embodiments of the invention the laser and/or its beam may be moved in lieu of, or in addition to, workpiece displacement to effect scanning. Multiple laser beams may be employed for the functions of melting and superheating the cladding material and heating adjacent substrate surface area to enhance the wettability of substrate surface to allow flow of molten cladding material thereon. The spacing between units of cladding material on the substrate surface initially applied should be at least one-half the average span on the substrate surface of the units surrounding each space and no greater than a distance which would lead to discontinuity between adjacent melted and resolidified units. Preferably, spacings and cladding units sizes will be in the same dimensional range, e.g., parallel $\frac{1}{8}$–$\frac{1}{4}$ inch rods of cladding material spaced $\frac{1}{8}$–$\frac{1}{4}$ inch apart (on a rod center-to-rod center basis). In the extreme case, circular cross-section rods may be placed side-by-side allowing the exposed substrate surface under their lower curves to constitute the flow distance.

The practice of the invention is further illustrated by the following non-limiting examples. All of the values given for laser beam power and power density given in the following examples are given for that calculated to be at the surface of the workpiece.

EXAMPLE 1

A substrate plate of AISI 4815 steel was coated with a $\frac{1}{4}$ mil thick layer of manganese phosphate and then preheated to about 450° to 500° F in a furnace. Then the plate was removed from the furnace and stellite rods of $\frac{1}{8}$ inch diameter (Stellite Alloy No. 1, cast) were placed on the plate with a spacing of $\frac{1}{4}$ inch between rods. An unoscillated laser beam of approximately $\frac{1}{8}$ inch in core diameter and 3 kilowatts power was scanned along the length of the rods, back and forth at a scanning rate of 10 inches per minute. A mixture of argon flowing at 5 cubic feet per hour and hydrogen flowing at 10 cubic feet per hour were used as a shielding gas. The stellite rods melted and flowed over the steel plate and resolidified as a well bonded clad. The laser core power density was 66 kw/in$^2$.

Figure 5:
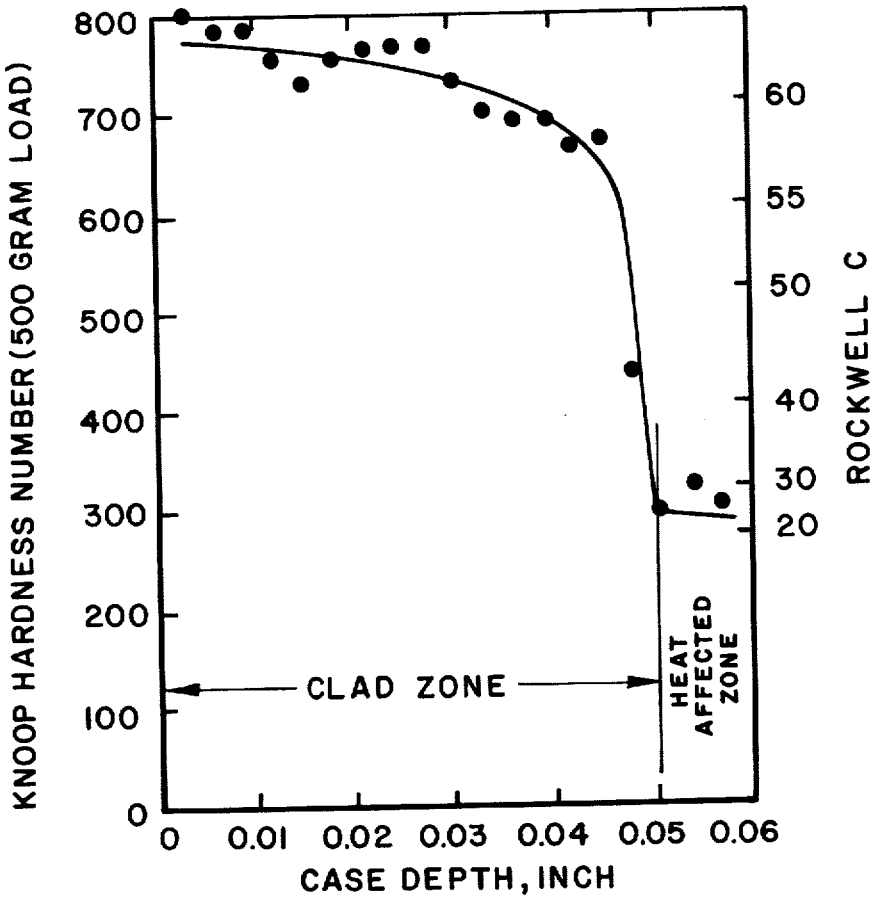
FIG. 5 is a graph showing hardness profile of the clad and underlying substrate after treatment in accordance with a preferred embodiment of the invention.
Figure 6:
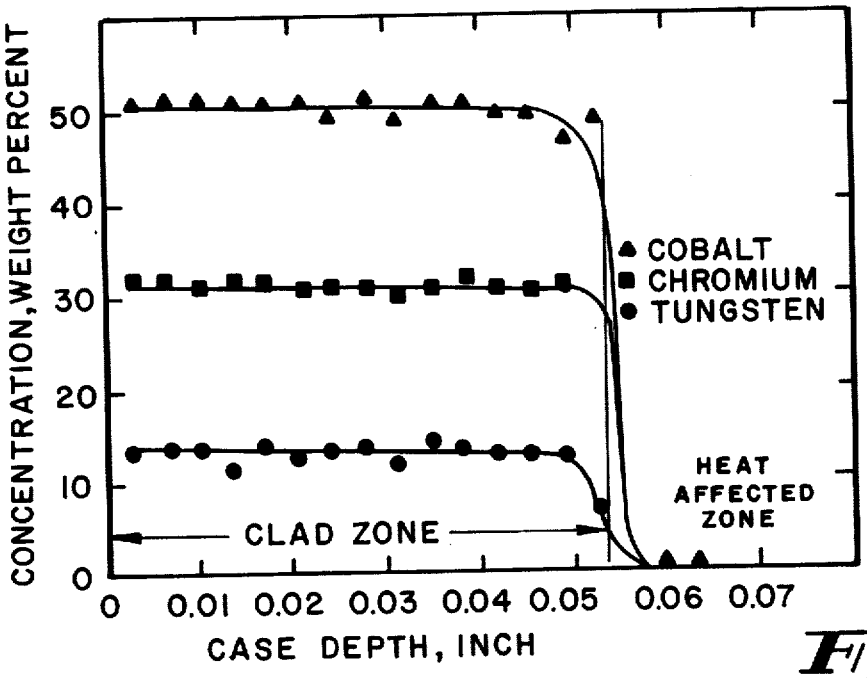
FIG. 6 is a similar profile of alloying elements.

FIG. 5 shows hardness of the clad zone as a function of case depth of the clad-on layer. The clad zone is 0.05 inch thick and in this zone hardness is between 58 and 63 on a Rockwell C scale while the hardness of the heat affected zone underlying the clad and of the base metal of the substrate is less than 30 on the same Rockwell C scale. FIG. 6 shows chemical composition of the clad zone as a function of depth of the clad wherein it is seen that the concentration of the stellite ingredients, cobalt, chromium, and tungsten, is essentially constant with depth and in amounts corresponding essentially to that of the original stellite rods, thus indicating that during laser cladding there is very little dilution of the cladding material with substrate material.

Figure 7:
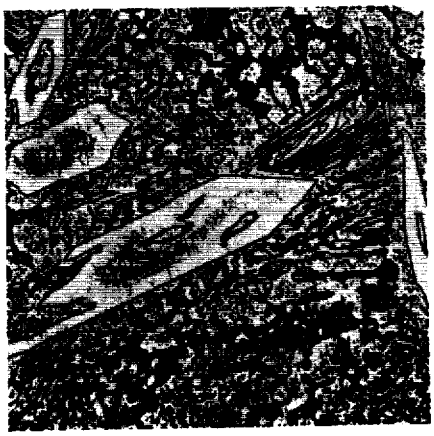
Fig. 7 (PRIOR ART)
FIG. 7–10 are photomicrographs of clads made, respectively, in accordance with the prior art and the processes of the above described three embodiments of the present invention.
Figure 8:
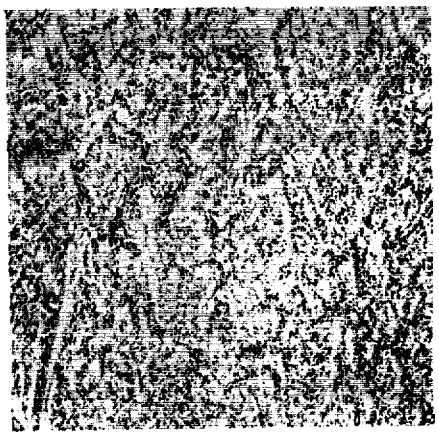

FIGS. 7 and 8 are microstructures of clads made in accordance with oxy-acetylene cladding and laser cladding, respectively. The oxy-acetylene clad shows massive carbide particles of high hardness (Rockwell C70 or more) embedded in a soft matrix (Rockwell C45) and displays on overall hardness of Rockwell C51. On the other hand, the laser clad shows a homogeneous and a fine microstructure of uniform hardness of Rockwell C60.

EXAMPLE 2

The same substrate and cladding materials as in Example I were processed through a second pass (after preheating at 900° F) using local oscillation of the laser beam which was scanned at a rate of 10 inches per minute with 5.25 kw power. Local oscillation was performed at 690 Hertz in a direction perpendicular to scanning. The basic laser beam size was a rectangle of ⅛ inch long by ½ inch wide (the length dimension being parallel to the scanning direction and the width dimension being orthogonal thereto) and the scanning achieved an effective laser beam width of ½ in. The laser processing was carried out in an atmosphere formed by argon flowing through at 5 cubic feet per hour and hydrogen at 10 cubic feet per hour. The clad substrate was postheated at 900° F for 5 minutes. The result was that the clad surface was made essentially flat in contrast to a wavy surface in the product of Example I. The average hardness of the clad layer was 55 and that of the substrate was 20 (both on Rockwell C scale.) The laser core power density was 23 kw/in$^2$.

EXAMPLE III

Cast Stellite Alloy No. 1 rods of 3/16 inch diameter spaced 3/16 inch apart were clad on AISI 4340 plate substrates, preheated to 900° F, by using a laser beam with a scanning speed of 10 inches/minute in an oxygen, acetylene gas mixture atmosphere under carburizing conditions. The laser beam power was 12.75 kw. The core power density was 280 kw/in$^2$. The clad substrate was post heated with oxy-acetylene flame for 3 minutes. The clad-on layer had an average hardness of 60 (Rockwell C). The base metal hardness was 36 (Rockwell C).

EXAMPLE IV

Rods of 3/16 inch diameter cast Stellite Alloy No. 6 were clad on AISI 4815 plate substrate preheated to 700° F, in oxygen, acetylene gas mixture under carburizing conditions. The laser scanning speed was 10 inches per minute and laser power was 9 kw. The core power density was 198 kw/in$^2$. The clad substrate was post heated with oxy-acetylene flame for 1 minute. The resultant clad on layer had an average hardness of 48 (Rockwell C) and the average base metal hardness was 20 (Rockwell C).

EXAMPLE V

Dura-Face [alloys] *alloy, a powderlike coating layer of* an alloy containing nickel, chromium, and silicates, manufactured by Ingersoll Products Division of Borg Warner Corporation, *and applied on substrates by plasma or flame spray* was clad onto AISI C1080 plate substrates *by laser scanning.* No preheating or post heating was used *except as incidental to the Dura-Face application before laser treatment.* The working atmosphere comprised of argon flowing at 5 cubic feet per hour and hydrogen flowing at 5 cubic feet per hour. The scanning speed was 10 inches/minute. The thickness of applied cladding material was 0.080 inch. The width of applied cladding material was 1 inch. The laser power was 10.5 kw. The beam size was ½ inch wide by ⅛ inch long as that used in Example II. The core power density was 47 kw/in$^2$. The average hardness of the clad-on layer was 64 (Rockwell C) and the average base metal hardness was 20 (Rockwell C).

EXAMPLE VI

Figure 9:
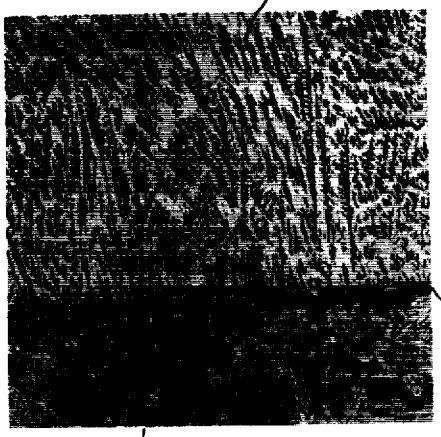

AISI 304 stainless steel was clad on AISI C1018 plate substrates. The scanning speed was 8 inches per minute. No preheating or post heating was used. The laser power was 13.5 kw. The effective beam size was ⅜ inch wide by ⅛ inch long. The core power density was 80 kw/in$^2$. Hydrogen flowing at 10 cubic feet per hour formed the working atmosphere. The thickness of cladding material was 0.040 inch and the width of the cladding material was ⅜ inches. The average hardness of the clad-on layer was 88 (Rockwell B) and the base metal hardness was 88 (Rockwell B). A cross-sectional view of the cladding is indicated in FIG. 9.

EXAMPLE VII

Figure 10:
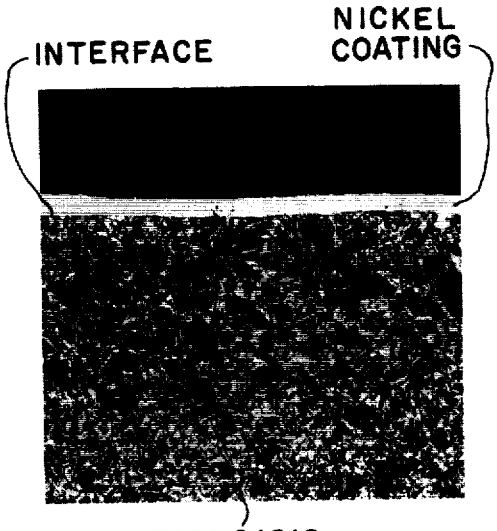

Nickel powder was spread on AISIC 1018 substrate plates and clad thereon by scanning at 20 in/min. The nickel powder was −325 mesh size (U.S. standard corresponding to zero to 44 micron diameter spheres) and sprinkled on a substrate surface precoated with ¼ mil thick manganese [phosphates] *phosphate.* Thickness of the powder sprinkled was 0.005 inch. The working atmosphere was hydrogen flowing at 5 cubic feet per hour. No preheating or post heating was used. Laser power was 9 kw and effective beam size was ⅛ inch long by ½ inch wide. The core power density was 40 kw/in$^2$. A cross-section photomicrograph of the resultant product is shown in FIG. 10.

Figure 11:
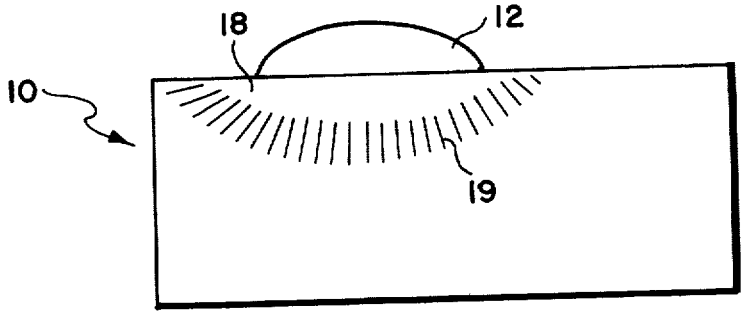
FIG. 11 is a drawing of a photomicrograph of a clad made in accordance with the processes of the present invention.

FIG. 11 is a drawing of a photomicrograph at five times magnification of a sawed and polished cross-section of a layer 12 clad to an AISI 4815 steel substrate in accordance with Examples I and corresponding essentially to the schematic illustration of a similar product in FIG. 2. The heat affected zone 18 is bounded by an internal band 19 which is clearly recognizable at this level of magnification.

It is evident that those skilled in the art, once given the benefit of the foregoing disclosure, may now make numerous other uses and modificatons of, and departures from the specific embodiments described herein without departing from the inventive concepts. Consequently, the invention is to be construed as embracing each and every novel feature and novel combination of features present in, or possessed by the apparatus and techniques herein disclosed and limited solely by the scope and spirit of the appended claims.

What is claimed:

1. Cladding method comprising, continuously scanning a metal substrate surface with a CW operating laser beam having a core power density of [29] *20* to 500 kilowatts per square inch in linear traces with a longitudinal scanning speed along such linear trace of 5–50 inches per minute.

the scanning being carried out in a pattern to incrementally trace the surface with spaced scan line patterns, simultaneously feeding a cladding metal to the substrate surface to intercept essentially the entire laser beam core and absorb essentially the entire beam energy so that the cladding material is melted and superheated and with application of laser beam power thereto for an essentially continuous period of at least 100 milliseconds and so that the adjacent substrate surface is heat treated at the same time to improve its wettability but melted only to the extent of a superficial surface layer thereof.

2. Cladding method in accordance with claim 1 wherein the cladding material is fed in elongated form having a width dimension perpendicular to the scan line direction with a spacing of at least one-half said width dimension between the loci of material feed along adjacent spaced scan lines.

3. Cladding method in accordance with claim 1 and further comprising, locally oscillating the laser beam while scanning.

4. Cladding method in accordance with claim 1 and further comprising, rescanning the clad surface with a laser beam to smooth the clad.

5. Cladding method in accordance with claim 4 wherein the laser beam used for rescanning is maintained at 20 to 50 per cent of power density of the original beam used for cladding.

6. Cladding method comprising, butting elongated spaced units of cladding material against the surface of a substrate of higher melting point than the cladding material, the average spacing between units being at least one-half of average unit width, impinging a beam of radiant energy from a CW laser upon the cladding material units to heat said units and adjacent surface areas of the substrate, relatively scanning the beam longitudinally along said units of cladding material and controlling heat input to melt and superheat the units of cladding material while simultaneously heating the adjacent substrate surface areas to enhance the flow of molten cladding material thereon, and wherein the laser beam is focused to a 0.025 to 1.0 inch diameter circle, or area equivalent of other form, scans along the cladding units at a rate 5 to 50 inches per minute and comprises a power of 1 to 20 kilowatts.

7. Cladding method in accordance with claim 6 wherein the cladding material units comprise rod or wire form.

8. Cladding method in accordance with claim 6 wherein the laser beam is locally oscillated while scanning.

9. Cladding method in accordance with claim 6 wherein the laser beam has a high power density core portion of less lateral width than said units and an outer low power density fringe which impinges directly on the space between units.

10. Cladding method in accordance with claim 6 wherein the laser beam is of essentially the same width as the width of said units and has a substantially uniform power density.

11. Cladding method in accordance with claim 6 wherein temperature of the cladding material is controlled after superheating to cool said material from superheat temperature to its melting (freezing) point at a first rapid rate to maintain fine grain structure therein, and is thereafter cooled more slowly down to below about 1000° F at a second slower rate to avoid cracking.

12. Cladding method in accordance with claim 11 wherein said first rate is above 1000° F per minute and said second rate is below 1000° F per minute.

13. Cladding method in accordance with claim 6 and further comprising, treating a surface layer of the substrate to lower its melting point while cladding so that a thin skin portion of said surface layer melts under cladding conditions.

14. Cladding method in accordance with claim 6 and further comprising, rescanning said radiant energy beam across the clad parts in at least one additional scan after cladding to smooth the clad surface.

15. Cladding method in accordance with claim 14 wherein said additional scanning passes are made at lower power density than used for cladding.

16. Cladding method in accordance with claim 6 and further comprising, providing temporal as well as physical spacing of the arrangement of said spaced units.

17. Cladding method in accordance with claim 16 wherein a length of cladding material is continuously fed into a radiant energy beam through relative movement thereof while providing relative movement between a substrate and the meeting point of the beam and material, said point being between the surface of said substrate and the source of radiant energy beam.

* * * * *